United States Patent
Deschaseaux

(10) Patent No.: US 6,550,925 B1
(45) Date of Patent: Apr. 22, 2003

(54) MIRROR SUPPORT

(75) Inventor: Gérard Deschaseaux, Belin-Beliet (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/019,854

(22) PCT Filed: May 17, 2000

(86) PCT No.: PCT/FR00/01325

§ 371 (c)(1),
(2), (4) Date: Nov. 8, 2001

(87) PCT Pub. No.: WO00/70384

PCT Pub. Date: Nov. 23, 2000

(30) Foreign Application Priority Data

May 18, 1999 (FR) .............................. 99 06285

(51) Int. Cl.⁷ .............................................. G02B 7/182
(52) U.S. Cl. .................. 359/872; 359/871; 359/873; 359/877
(58) Field of Search ................. 359/872, 871, 359/873, 877, 881; 248/466, 476, 477, 474, 489; 355/881, 882

(56) References Cited

U.S. PATENT DOCUMENTS

| 4,401,288 A | 8/1983 | Thompson | |
| 4,442,524 A * | 4/1984 | Reeder et al. | 359/873 |
| 4,655,548 A | 4/1987 | Jue | |
| 4,721,274 A * | 1/1988 | Erb | 248/179.1 |
| 4,764,002 A * | 8/1988 | Wilson | 359/225 |
| 4,775,815 A * | 10/1988 | Heinz | 310/328 |
| 4,869,583 A | 9/1989 | Tiedje | |
| 4,880,301 A | 11/1989 | Gross | |
| 5,438,457 A * | 8/1995 | Moore | 248/467 |
| 6,315,427 B1 * | 11/2001 | Simon | 359/223 |
| 6,386,719 B1 * | 5/2002 | Lee | 359/871 |

OTHER PUBLICATIONS

International Search Report for PCT/FR00/01325—Aug. 23, 2000.

* cited by examiner

Primary Examiner—Mohammad Sikder
(74) Attorney, Agent, or Firm—Harness, Dickey & Pierce, P.L.C.

(57) ABSTRACT

Apart from a frame (10) that may be formed of parts mutually free to move in translation, the mirror support comprises a lever (29) suspended from a console (28) by springs (30) and position adjustment screws (33,34) to apply the required orientation with excellent precision; the mirror is attached to this lever. It may be fitted on a rotating tray to put it into the required angular position. This invention is applicable to oscillating laser cavity mirrors because the position of the mirror may be adjusted with extreme accuracy and fixed reliably.

9 Claims, 3 Drawing Sheets

MIRROR SUPPORT

DESCRIPTION

The purpose of this invention is a mirror support, used in particular to adjust the position and orientation of mirrors reflecting a beam in a laser oscillating cavity.

Some lasers comprise a regenerating cavity through which light passes, being reflected in sequence on two mirrors at the ends. These mirrors must be oriented with very high precision to reflect the beam in the required direction. They may be provided with limited reflecting patterns that define the shape of the exit beam, which also makes it necessary to perfectly align them along the length of the path of the beam, by adjusting their side position, or even their angular position since their reflecting patterns are usually not circular.

Therefore, the positions of the two mirrors have to be adjusted with a great deal of care, and thus a search is made for an adjustable mirror support that offers sufficient adjustment precision and sensitivity, and that is stable and can be immobilized in order to be able to move the cavity without worrying about misadjusting the position of the mirrors. The invention satisfies these needs.

In its most general form, it relates to a mirror support characterized in that it comprises a frame, a lever suspended from the frame by springs, a mirror mounting at the end of an arm, the mirror being fixed to the mounting perpendicular to the arm, and two sets of adjustable stops and counter stops sliding through the frame and bearing on the lever, the stop and counter-stop assemblies sliding in the two directions perpendicular to each other and perpendicular to the lever respectively, the stops opposing movement of the springs, and the arm being articulated to the lever at an eccentric position of the lever and articulated to the frame. For the purposes of the invention, the counter stops are mechanical parts acting in opposition to the stops that are used to retain a part (in this case the lever) between them and the stops at a position defined by the position of the stops. The stops and the counter stops may consist of sets of opposing screws that may be on the same center line.

This device is sufficient to orient the mirrors, which is the most important constraint. If it is also required to adjust the alignment of the mirrors, then it is advantageous for the frame to comprise a fixed part, a first mobile part sliding on the fixed part in a first translation direction and a second mobile part sliding on the first mobile part in a second translation direction and from which the lever is suspended, springs connecting the first mobile part to the fixed part and to the second mobile part, and extending along the first and second directions of translation respectively, adjustable stops extending through the fixed part in the first translation direction as far as the first mobile part, and through the first mobile part in the second translation direction as far as the second mobile part, respectively, the stops opposing the force applied by the springs, and locking screws connecting the first mobile part and extending along the first translation direction and the second translation direction, respectively.

Finally, the angular position of the mirror as it rotates in its plane, can be adjusted if the mounting comprises a part fixed to the arm and a rotating tray on the part fixed to the arm, the mirror being fixed to the tray, and a means of adjusting the angular position of the tray.

Finally, it is advantageous if the stops are adjustment screws and the counter stops are pressure screws.

An excellent fineness of the orientation adjustment is obtained if each of the sets of stops and counter stops comprises a stop and counter stop close to the mounting and a stop and counter stop remote from the mounting, and if the arm is articulated to the frame close to the mirror and to the lever on the opposite side of the mirror and adjacent to the stop and to the counter stop remote from the mounting.

BRIEF DESCRIPTION OF THE DRAWINGS

The invention will now be described in more detail with reference to the following figures.

DETAILED DESCRIPTION OF THE DRAWINGS

Figure 1:
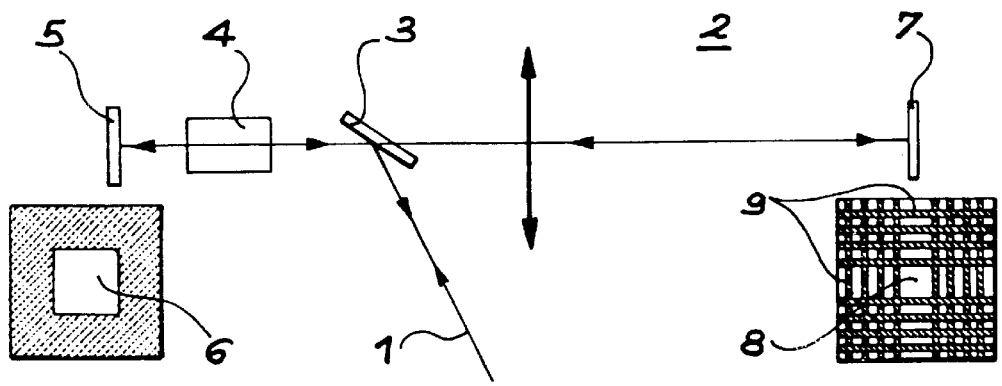
FIG. 1 is a diagrammatic view of a laser cavity.
Figure 2:
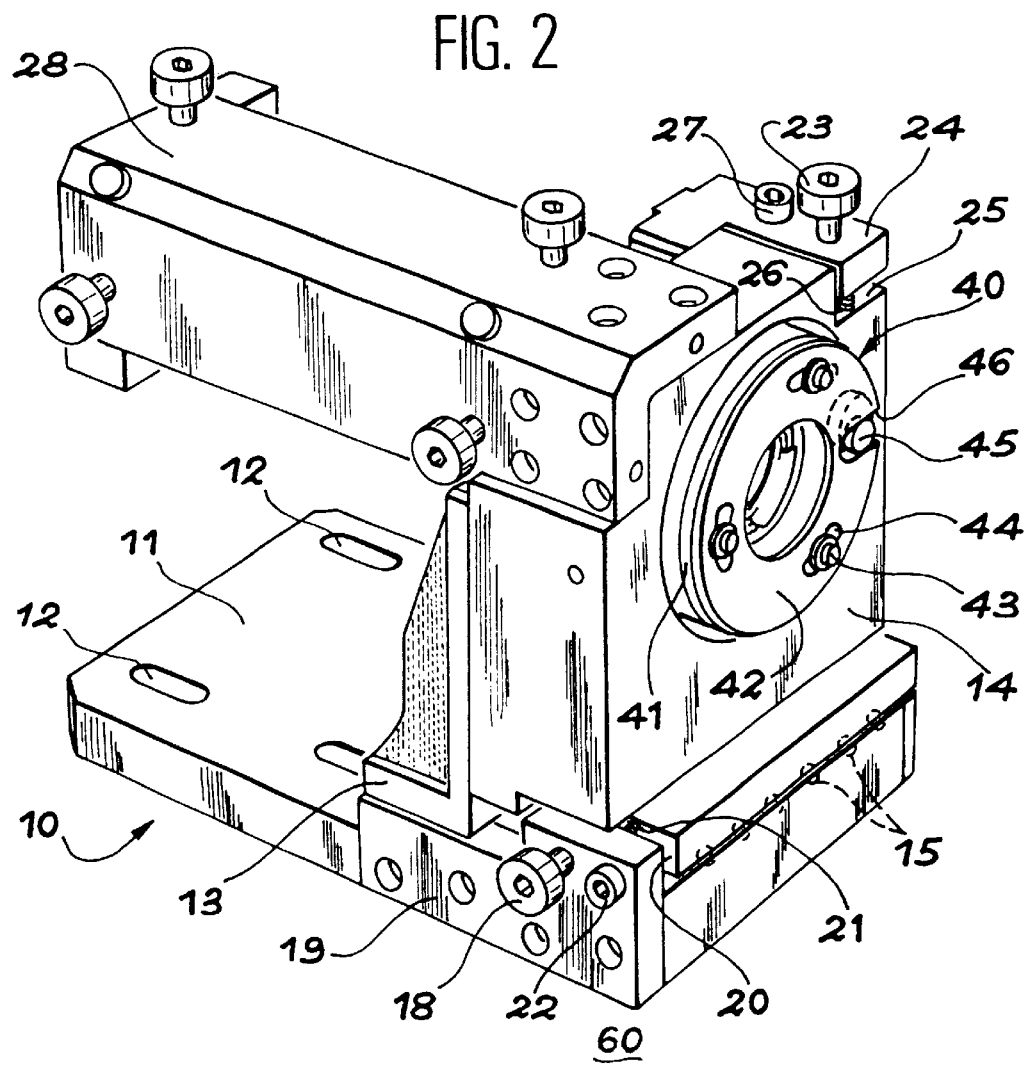
FIGS. 2 and 3 are general views of the mirror support, and the other
Figure 3:
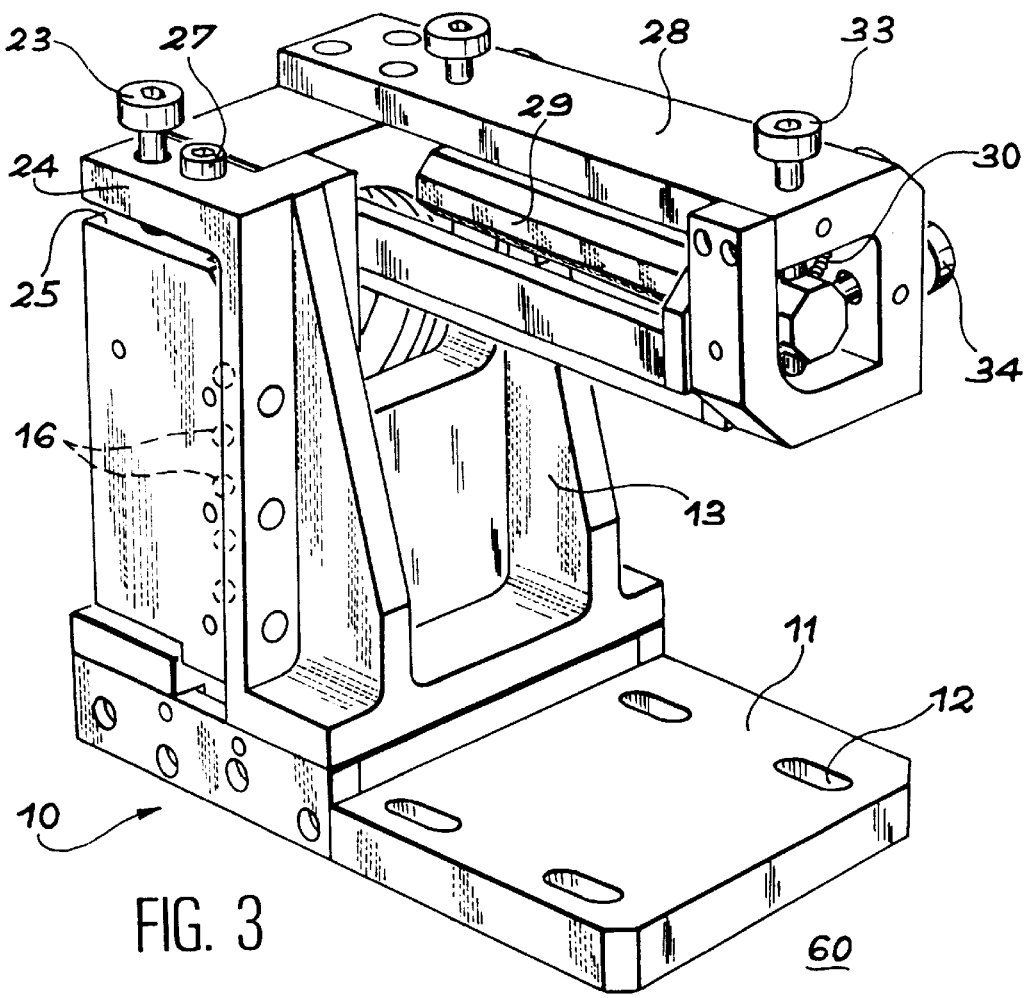

A polarized light beam 1 output from a laser arrives at an angle into a longitudinal regenerating cavity 2 (FIG. 1) and a polarizer 3 returns it to a light amplifier 4 and then to a first mirror 5, the reflecting pattern 6 of the first mirror being a square. The beam 1 is reflected in the opposite direction through the amplifier 4 and the polarizer 3, passes through the polarizer this time without deviation, and finishes by arriving at a second mirror 7 that may be placed at 4.4 meters from the first mirror and for which the reflecting pattern 8 corresponds to the Fourier transform of the square 6 and more precisely to a square surface on which striations 9 have been formed crossing each other to form a mesh. The beam 1 is returned by the second mirror 7 towards the first mirror 5, but the lens 3 intercepts it and it thus does 50 forward-return movements before it exits in its departure direction in the opposite direction. This large number of forward-return movements requires very high precision in the alignment of the two mirrors. The support 60 that will now be described can be used for either of the mirrors 5 and 7. FIGS. 2 and 3 show that it comprises firstly a frame 10 formed of three parts, namely a plate 11 assumed to be fixed and that may be fixed to an inside wall of the cavity 2 by screws not shown passing through drillings 12 formed through the plate 11; a first moving part 13 connected to plate 11; and a second moving part 14 connected to the previous part; connections between the three parts of the frame consist of ball bearing races 15 and 16 along which the first moving part 13 slides in the transverse direction on plate 11 and the second moving part 14 slides in the vertical direction on the first part 13. An adjustment screw 18 is engaged through a lug-shaped portion 19 mounted on the plate 11, and its free end reaches a thrust face 20 of the first moving part 13 and pushes it when screw 18 is turned; a spring 21 opposing the screw 18 connects the thrust face 20 to the lug 19 and brings them together to form the stop for the screw 18. This system is capable of precisely and accurately adjusting the transverse position of the first mobile part 13 and consequently also of the second mobile part 14; there is also another screw 22, that is a pressure or clamping screw, engaged in the thrust face 20 that passes through the lug 19; screwing it tends to bring the thrust face 20 closer to the lug 19 and therefore locks the first mobile part 13 onto the plate 11 by holding the stop of screw 18, tightened slightly to prevent maladjustments but without introducing mechanical constraints that could deform the parts excessively and distort the adjustment previously obtained using screw 18. The system remains perfectly stable even if the mirror support is moved afterwards. A similar system exists to bring together the two mobile parts 13 and 14 towards each other and to adjust their position in the vertical direction; the result is a threaded adjustment screw 23 passing through a lug-shaped portion 24 of the first mobile part 13 and pressing on a thrust face 25 of the second mobile part 14, a spring 26 tensioned between the lug 24 and the thrust face 25, and a clamping screw 27 capable of pulling the mobile parts 13 and 14 towards each other at the location of the lug 24 and the thrust face 25 to hold the stop in place.

Figure 4:
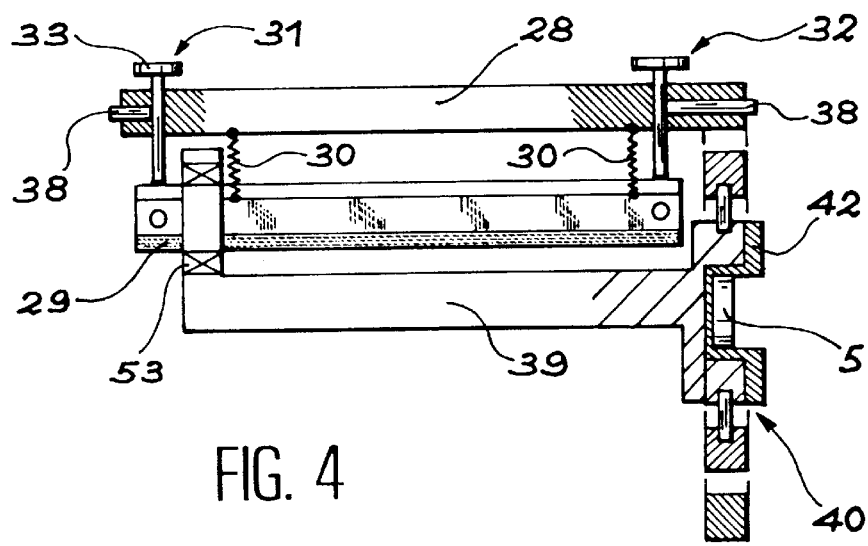
FIGS. 4, 5, 6 and 7 illustrate the mechanical suspension lever system in more detail.

The second mobile part 14 supports a console 28 with a straight square section vertically above the plate 11 over a fairly long length and that contains a lever 29, that cannot be seen in FIG. 2, and that forms an essential part of the invention. It extends approximately perpendicular to the two displacement directions of the mobile parts 13 and 14, like the console 28, and it is suspended from the console by a pair of springs 30 laid out obliquely. The console comprises mechanical systems similar to the previous systems to adjust the position of the lever 29 in the form of two identical groups 31 and 32 and placed at its ends (FIGS. 4 and 5); each comprises a first adjustment screw 33 engaged through the console 28, the free end of which is supported on the lever 29, a second adjustment screw 34 arranged in the same way but perpendicular to the previous screw, and two other screws 35 and 36 that are pressure screws engaged through a stirrup 37 in the console 28 and that come into contact with the faces of the lever 29 opposite the faces on which the screws 33 and 34 are stopped respectively. Since screws 35 and 36 are on the same center lines as screws 33 and 34 respectively on the other side of lever 29, a cross-shaped assembly is used in which screws 33 and 34, opposing the action of the springs 30, are used to adjust the position of the lever 29 and the screws 35 and 36 are counter stop screws that hold the lever 29 firmly in place at the previously chosen position by exerting a slight clamping force; their action is equivalent to the action of the pressure screws 22 and 27 mentioned above. Finally, other pressure screws with references 38 are engaged in the console 28 and their ends bear on the side of screws 33 and 34 respectively to hold them in place despite possible vibrations.

Rotation of screws 33 in one group 31 or in the other group 32 will cause tilting of the lever 29 in a plane, and rotation of screws 34 will tilt lever 39 in another plane perpendicular to the previous plane; it is clear that tipping of these levers will rotate mirror 5 or 7 in the same directions.

Figure 6:
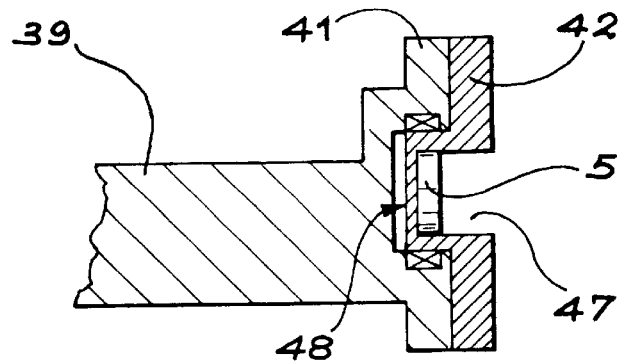

Lever 29 is attached through a universal joint 53 to an arm 39 that projects forwards to extend through openings in the mobile parts 13 and 14 to end at a mounting 40 of the mirror, projecting at the end of frame 10. The mounting 40 is composed of a fixed part 41 fixed to the arm 39 and a plate 42 laid out on the fixed part 41 so that it can rotate (FIGS. 2, 4 and 6); it is held in place on the fixed part 41 by a rotating drum 48, by screws 43 fitted into oblong holes 44 in the plate 42 and which therefore enable an angular movement of the plate; a cam 45 is held in place in a radial groove 46 in the plate 42 and if it is rotated (possible using a screwdriver), causes the plate 42 to rotate on the fixed part 41; therefore the angular position of the mirror 5 or 7 can be adjusted. The mirror, for example 5, may be glued to the bottom of a compartment 47 at the center of the plate 42, while being directed to the opposite end of lever 29.

The mounting 40 may be supported by the second mobile part 14 through a universal joint mechanism comprising a ring (49) (FIG. 7) that enables rotations imposed by groups of stops 31 and 32 while reducing the force applied on the springs 30 due to part of the weight of lever 29 and the parts connected to it; the ring 49 is housed in an opening 50 of the second mobile part 14, like the mounting 40; it is connected to the second mobile part 14 by a first pair of balls 51 aligned horizontally, and to the fixed part by a second pair of balls 52 aligned vertically; the alignment directions of the pairs of balls 51 and 52 correspond to the pivot axes of the ring 49 and the mounting 40, which therefore freely moves into the required orientation.

Figure 5:
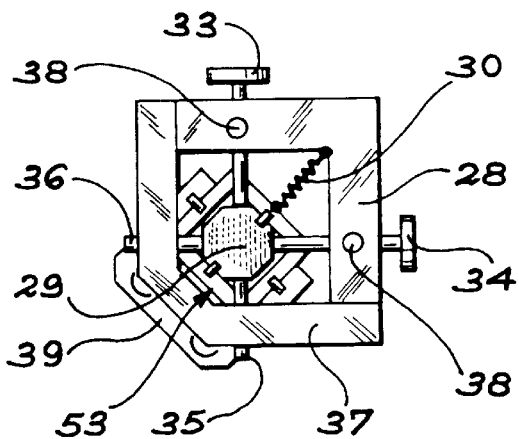
Figure 7:
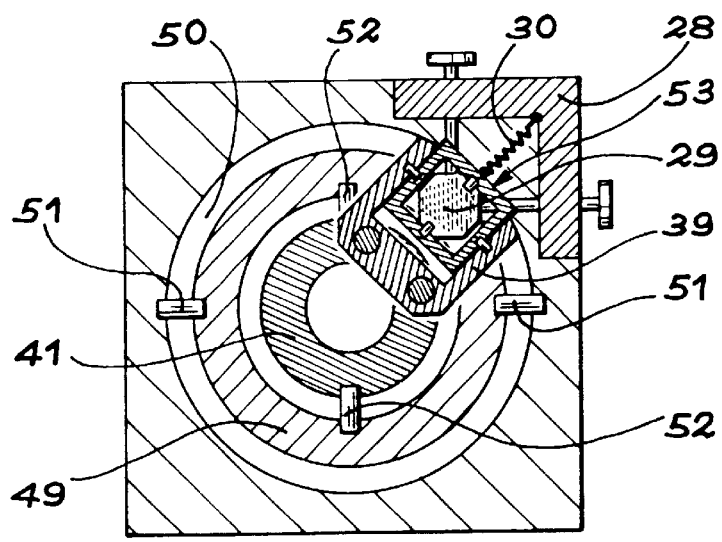

The universal joint 53 between the lever 29 and the arm 39 is constructed in the same way as the previous universal joint as can be seen in FIGS. 5 and 7. Since it is opposite to mirror 5, a normal method of adjusting the mirror orientation will consist firstly of acting on screws 33 and 34 in group 31 adjacent to the joint 53 such that the screwing depth is applied to it perfectly, and that a relatively large rotation is transmitted to the arm 39; a screwing action can then be applied to the screws 33 and 34 in the other group 32 to make the lever 29 pivot about the screws 33 and 34 of the first group 31; the universal joint 53 will only move slightly, which is acceptable for making a fine adjustment to the orientation of the mirror 5 by rotating the arm 39 slowly.

What is claimed is:

1. Mirror support characterized in that it comprises a frame (10; 11, 13, 14; 28), a lever (29) suspended from the frame by springs (30), a mounting (40) for the mirror (5) at the end of an arm (39), the mirror being fixed to the mounting perpendicular to the arm, and two sets (33, 35; 34, 36) of adjustable stops and counter stops sliding through the frame (28) and bearing on the lever (29), the counter-stops (35, 36) opposing the stops (33, 34) through the lever, the stop and counter stops sliding in the two directions perpendicular to each other and to the lever respectively, the stops opposing movement of the springs, and the arm being articulated to the lever at an eccentric position of the lever and articulated to the frame.

2. Mirror support according to claim 1, characterized in that each of the stops and counter stops are respectively provided in a first assembly close to the mounting and a second assembly remote from the mounting along the arm.

3. Mirror support according to claim 1, characterized in that the frame (10) comprises a fixed part (11), a first mobile part (13) sliding on the fixed part in a first translation direction and a second mobile part (14) sliding on the first mobile part (13) in a second translation direction and from which the lever (29) is suspended, springs (21, 26) connecting the first mobile part to the fixed part and to the second mobile part, and extending along the first and second directions of translation respectively, adjustable stops (18, 23) extending through the fixed part in the first translation direction as far as the first mobile part, and through the first mobile part in the second translation direction as far as the second mobile part, respectively, the stops opposing the force applied by the springs, and locking screws (22, 27) connecting the first mobile part and extending along the first translation direction and the second translation direction, respectively.

4. Mirror support according to claim 1, characterized in that the stops (18, 23, 33, 34) are adjusting screws.

5. Mirror support according to claim 1, characterized in that the counter stops (35, 36) are pressure screws.

6. Mirror support according to claim 1, characterized in that the mounting (40) comprises a part (41) fixed to the arm (29) and a rotating tray (42) rotating on the part fixed to the arm, the mirror being fixed to the plate, and a means (45) of adjusting the angular position of tray.

7. Mirror support according to claim 6, characterized in that the means of adjusting the angular position comprises a cam (45) in a groove (46) in the tray (42).

8. Mirror support according to claim 1, characterized in that it comprises a mounting (40) of the mirror pivoting in the frame (14) through a ring (49), the ring pivoting in the frame about the first axis and the mounting pivoting in the ring about a second axis perpendicular to the first axis.

9. Mirror support according to claim 2, characterized in that the arm (39) is articulated to the frame close to the mirror (5) and to the lever (29) opposite the mirror, adjacent to the stop and the counter stop (31) remote from the mounting.

* * * * *